United States Patent
Lee

(10) Patent No.: US 10,815,870 B2
(45) Date of Patent: Oct. 27, 2020

(54) CONTROL METHOD OF COOLING SYSTEM

(71) Applicants: HYUNDAI MOTOR COMPANY, Seoul (KR); KIA MOTORS CORPORATION, Seoul (KR)

(72) Inventor: Yonggyu Lee, Suwon-si (KR)

(73) Assignees: HYUNDAI MOTOR COMPANY, Suwon-si, Gyeonggi-do (KR); KIA MOTORS CORPORATION, Suwon-si, Gyeonggi-do (KR)

( * ) Notice: Subject to any disclaimer, the term of this patent is extended or adjusted under 35 U.S.C. 154(b) by 92 days.

(21) Appl. No.: 16/205,049

(22) Filed: Nov. 29, 2018

(65) Prior Publication Data
US 2020/0063637 A1  Feb. 27, 2020

(30) Foreign Application Priority Data

Aug. 27, 2018  (KR) .......................... 10-2018-0100449

(51) Int. Cl.
*F01P 7/16* (2006.01)
*F02M 26/28* (2016.01)
(Continued)

(52) U.S. Cl.
CPC .............. *F01P 7/167* (2013.01); *F01P 7/165* (2013.01); *F02M 26/24* (2016.02); *F02M 26/28* (2016.02);
(Continued)

(58) Field of Classification Search
CPC ...... F01P 7/165; F01P 7/167; F01P 2007/146; F01P 3/02; F01P 2003/028;
(Continued)

(56) References Cited

U.S. PATENT DOCUMENTS

| | | | |
|---|---|---|---|
| 7,693,645 B2 * | 4/2010 | Nam | F02D 41/0052 123/568.21 |
| 8,701,603 B2 * | 4/2014 | Warnery | F01P 7/167 123/41.08 |

(Continued)

FOREIGN PATENT DOCUMENTS

JP          2014001681 A  *  1/2014

OTHER PUBLICATIONS

English machine translation of JP-2014001681-A provided by Espacenet (Year: 2020).*

*Primary Examiner* — Jacob M Amick
*Assistant Examiner* — Michael A Kessler
(74) *Attorney, Agent, or Firm* — Morgan, Lewis & Bockius LLP

(57) ABSTRACT

A control method for a cooling system includes determining, by the controller, whether the output signal of the ambient temperature sensor satisfies a predetermined an ambient low temperature driving condition, determining, by the controller, whether the output signal of the first coolant temperature sensor satisfies a predetermined first low temperature driving condition when the output signal of the ambient temperature sensor satisfies the predetermined the ambient low temperature driving condition and controlling, by the controller, the operation of the coolant control valve unit to open the first coolant passage and the third coolant passage and to close the second coolant passage when the output signal of the first coolant temperature sensor satisfies the predetermined first low temperature driving condition.

8 Claims, 5 Drawing Sheets

(51) Int. Cl.
    *F01P 7/14*     (2006.01)
    *F01P 3/02*     (2006.01)
    *F16K 31/524*     (2006.01)
    *F02M 26/24*     (2016.01)

(52) U.S. Cl.
    CPC .. *F16K 31/52416* (2013.01); *F01P 2003/028* (2013.01); *F01P 2007/146* (2013.01); *F01P 2025/13* (2013.01); *F01P 2025/31* (2013.01); *F01P 2025/32* (2013.01); *F01P 2025/66* (2013.01); *F01P 2060/04* (2013.01)

(58) Field of Classification Search
    CPC ............ F01P 2060/04; F01P 2060/045; F01P 2060/12; F02M 26/24; F02M 26/25; F02M 26/26; F02M 26/05; F02M 26/06; F02M 26/07; F02M 26/28; F02M 26/33; F02B 29/0443; F02D 2200/021; F02D 41/0065; F02D 41/0072; F02D 41/0077; F02D 2014/0067; F02D 2014/007; F16K 31/524; F16K 31/52408
    USPC .... 123/41.08, 41.09, 41.1, 568.12; 701/108; 60/605.2
    See application file for complete search history.

(56) References Cited

U.S. PATENT DOCUMENTS

| | | | | |
|---|---|---|---|---|
| 9,957,878 | B2* | 5/2018 | Takahashi | F01P 7/167 |
| 10,047,662 | B2* | 8/2018 | Takahashi | F01P 3/20 |
| 10,119,484 | B2* | 11/2018 | Park | F02M 26/06 |
| 2012/0090584 | A1* | 4/2012 | Jung | F02D 41/0065 123/568.12 |
| 2014/0283765 | A1* | 9/2014 | Naito | F02M 26/24 123/41.09 |
| 2016/0084593 | A1* | 3/2016 | Lee | F28F 27/02 165/287 |
| 2016/0090944 | A1* | 3/2016 | Takahashi | F02M 26/25 60/605.2 |
| 2017/0058753 | A1* | 3/2017 | Lee | F16K 11/165 |
| 2017/0145896 | A1* | 5/2017 | Lee | F16K 11/165 |
| 2017/0306898 | A1* | 10/2017 | Kim | F02M 31/205 |
| 2018/0334951 | A1* | 11/2018 | Uto | F02B 29/04 |
| 2019/0078494 | A1* | 3/2019 | Lee | F01P 7/14 |
| 2019/0120178 | A1* | 4/2019 | Park | F02D 41/0077 |
| 2019/0186340 | A1* | 6/2019 | Cho | F01P 3/02 |
| 2020/0040800 | A1* | 2/2020 | Kim | F01P 7/14 |
| 2020/0040801 | A1* | 2/2020 | Lee | F01P 3/02 |
| 2020/0040806 | A1* | 2/2020 | Kim | F02M 26/28 |
| 2020/0063640 | A1* | 2/2020 | Lee | F01P 3/02 |

* cited by examiner

CONTROL METHOD OF COOLING SYSTEM

CROSS-REFERENCE TO RELATED APPLICATION

This application claims priority to and the benefit of Korean Patent Application No. 10-2018-0100449 filed in the Korean Intellectual Property Office on Aug. 27, 2018, the entire contents of which are incorporated herein by reference.

BACKGROUND

(a) Field

The present disclosure relates to a control method of a cooling system.

(b) Description of the Related Art

One of the integrated heat management technologies is a separation cooling technique which improves the fuel efficiency by independently controlling a coolant temperature of a cylinder head and an engine block. For engines with separate cooling technology, the flow is stopped during warm-up to raise the temperature of an engine block in initial cold start.

The above information disclosed in this Background section is only for enhancement of understanding of the background of the invention and therefore it may contain information that does not form the prior art that is already known in this country to a person of ordinary skill in the art.

SUMMARY

One aspect of the present invention provides a control method of a cooling system capable of rapidly advancing an engine warm-up by blocking coolant flowing into an LP-EGR (low pressure exhaust gas recirculation) cooler. In the control method, coolant flowing into an LP-EGR cooler may be shut off to rapidly advance an engine warm-up.

Another aspect of the present invention provides a control method of a cooling system capable of preventing or minimizing overheating of a cooling system while blocking coolant flowing into an LP-EGR cooler.

A control method according to an embodiment of the present invention may be applied to a cooling system including a vehicle operation state detecting portion having a first coolant temperature sensor detecting a temperature of coolant flowing through a cylinder head and outputting a corresponding signal and a second coolant temperature sensor detecting a temperature of coolant flowing through an engine block and outputting a corresponding signal, an oil temperature sensor detecting a temperature of oil and outputting a corresponding signal, having an ambient temperature sensor detecting a temperature of ambient air and outputting a corresponding signal, an accelerator pedal sensor detecting an operation angle of an accelerator pedal and outputting a corresponding signal, a vehicle speed sensor detecting a speed of a vehicle and outputting a corresponding signal, an LP-EGR temperature sensor detecting a temperature of LP-EGR gas and outputting a corresponding signal and a timer, a coolant control valve unit receiving coolant from the cylinder head and having a cam which controls opening rates of a first coolant passage communicated with a LP-EGR cooler, a second coolant passage communicated with a radiator and a third coolant passage communicated with the engine block, an LP-EGR valve controlling flow of LP-EGR gas supplied to the LP-EGR cooler, and a controller controlling operations of the coolant control valve unit and the LP-EGR valve according to the output signals of the vehicle operation state detecting portion.

A control method according to an embodiment of the present invention may include determining, by the controller, whether the output signal of the first coolant temperature sensor satisfies a predetermined LP-EGR gas supply condition, controlling the LP-EGR valve to open by the controller if the LP-EGR gas supply condition is satisfied, estimating, by the controller, a coolant temperature in the LP-EGR cooler according to the output signals of the vehicle operation state detecting portion, and determining whether the predicted coolant temperature in the LP-EGR cooler satisfies a coolant supply condition and controlling the operation of the coolant control valve unit by the controller to open the first coolant passage if the coolant supply condition is satisfied.

The control method may further include determining whether at least one of the output signals of the first coolant temperature sensor, the LP-EGR gas temperature sensor and the output signal of the timer corresponds to a predetermined system protection condition if the coolant temperature does not correspond to the coolant supply condition, and wherein the controller may control the operation of the coolant control valve unit to open the first coolant passage if the system protection condition is satisfied.

The system protection condition may include a first system protection condition in which the output signal of the first coolant temperature sensor exceeds a predetermined warm driving temperature.

The system protection condition may include a second system protection condition in which the output signal of the LP-EGR gas temperature sensor exceeds a predetermined LP-EGR gas reference temperature.

The system protection condition may include a third system protection condition in which the output signal the timer exceeds a predetermined LP-EGR cooling delay signal.

The control method may further include closing the first coolant passage, the second coolant passage and the third coolant passage by controlling the operation of the coolant control valve unit if the system protection condition is not satisfied.

The control method may further include determining whether the LP-EGR valve has been opened if it is determined that the LP-EGR gas supply condition is not satisfied and wherein the controller may control the operation of the coolant control valve unit to open the first coolant passage if the LP-EGR valve has been opened.

The controller may control the operation of the coolant control valve unit to close the first coolant passage, the second coolant passage and the third coolant passage if the LP-EGR valve has not been opened.

According to the control method of the embodiment of the present invention, the coolant flowing into the LP-EGR cooler may be blocked, and the engine warm-up may be performed rapidly.

Further, it is possible to prevent the overheating of the cooling system while shutting off the coolant flowing into the LP-EGR cooler.

<Description of symbols>

Figure 1:
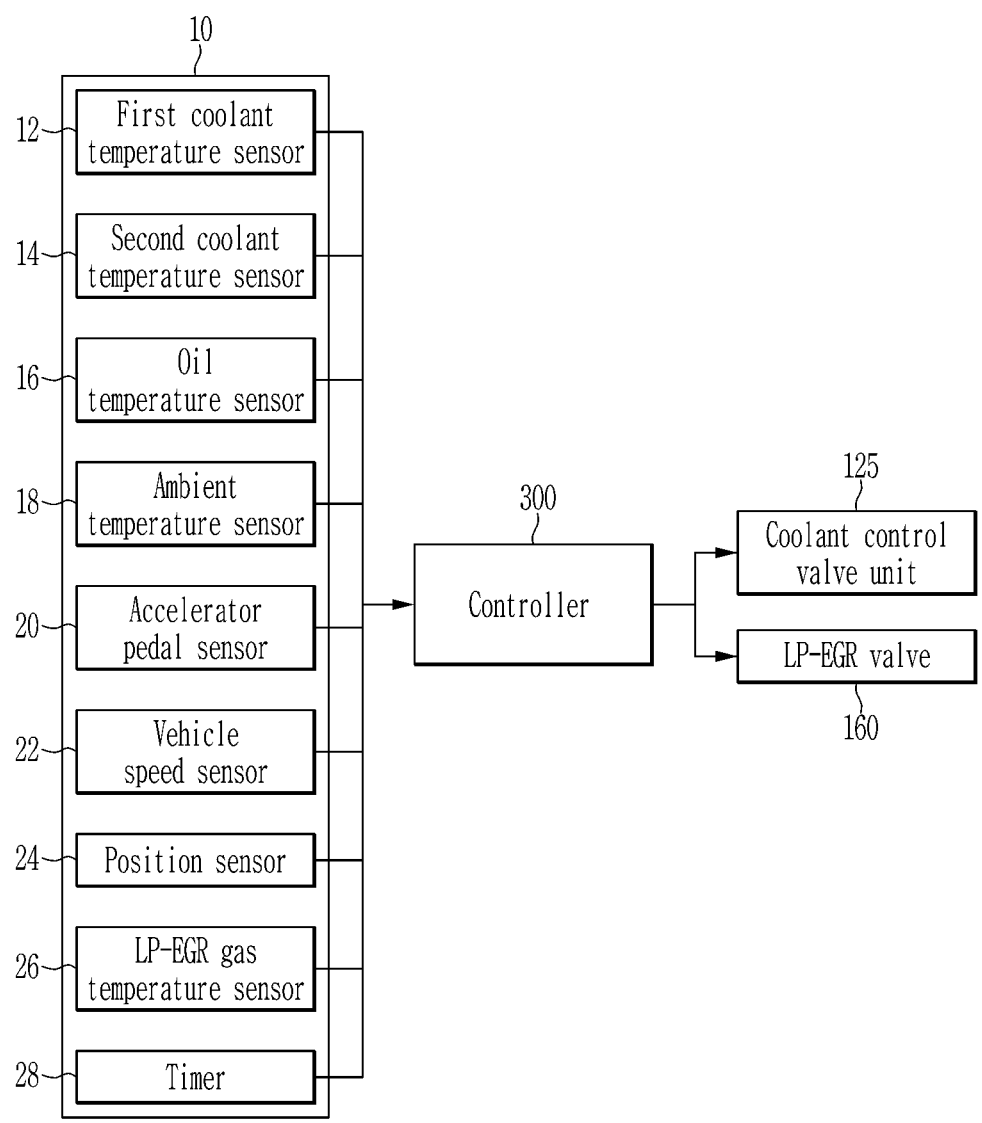
FIG. 1 is a block diagram of a control system applicable to a control method according to an embodiment of the present invention.

| | |
|---|---|
| 10: vehicle operation state detecting portion | |
| 12: first coolant temperature sensor | |
| 14: second coolant temperature sensor | |
| 16: oil temperature sensor | |
| 18: ambient temperature sensor | 20: accelerator pedal sensor |
| 22: vehicle speed sensor | 24: position sensor |
| 26: LP-EGR gas temperature sensor | 28: timer |
| 90: engine | 100: cylinder block |
| 105: cylinder head | 110: LP-EGR cooler |
| 115: heater | 125: coolant control valve unit |
| 130: radiator | 135: oil cooler |
| 140: oil control valve | 145: HP-EGR valve |
| 155: coolant pump | 160: LP-EGR valve |
| 170: intake manifold | 210: cam |
| 215a: first rod | 215b: second rod |
| 215c: third rod | 220: valve |
| 220a: first valve | 220b: second valve |
| 220c: third valve | 225a: first elastic member |
| 225b: second elastic member | 225c: third elastic member |
| 230a: first coolant passage | 230b: second coolant passage |
| 230c: third coolant passage | 300: controller |
| 305: motor | 310: gear box |
| 320a: first track | 320b: second track |
| 320c: third track | |

DETAILED DESCRIPTION OF EMBODIMENTS

Hereinafter, an embodiment of the present invention will be described in detail with reference to the accompanying drawings.

However, the size and thickness of each component illustrated in the drawings are arbitrarily shown for ease of description and the present invention is not limited thereto, and the thicknesses of portions and regions are exaggerated for clarity.

In addition, parts that are irrelevant to the description are omitted to clearly describe the embodiments of the present invention, and like reference numerals designate like elements throughout the specification.

In the following description, dividing names of components into first, second, and the like is to divide the names because the names of the components are the same, and an order thereof is not particularly limited.

For engines with separate cooling technology, the coolant flow may be stopped during warming-up to raise the temperature of an engine block in initial cold start. In order to maximize the warming-up performance in the initial cold start, the coolant flow into the LP-EGR cooler may be shut off.

Figure 2:
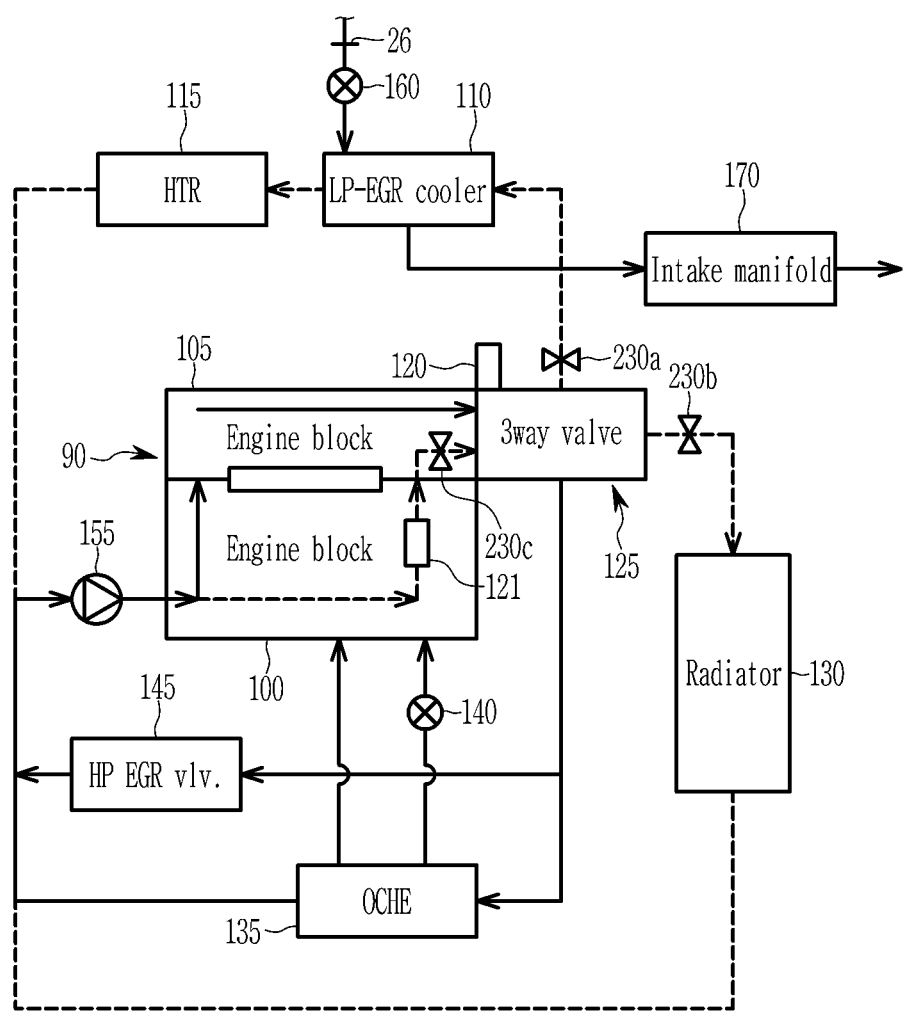
FIG. 2 is a schematic diagram of a control system applicable to a control method according to an embodiment of the present invention.

FIG. 1 is a block diagram of a control system applicable to a control method according to an embodiment of the present invention and FIG. 2 is a schematic diagram of a control system applicable to a control method according to an embodiment of the present invention.

Referring to FIG. 1 and FIG. 2, in embodiments, a cooling system according to an embodiment of the present invention includes a controller 300 for controlling the operation of a coolant control valve unit 125 and an LP-EGR valve 160 according to an output signal of the vehicle operation state detecting portion 10.

The vehicle operation state detecting portion 10 includes a first coolant temperature sensor 12, a second coolant temperature sensor 14, an oil temperature sensor 16 for measuring an engine oil temperature and outputting a corresponding signal, an ambient temperature sensor 18 for measuring an outdoor and outputting a corresponding signal, an accelerator pedal sensor 20 for measuring a position of an accelerator pedal and outputting a corresponding signal, a vehicle speed sensor 22 for measuring a vehicle speed and outputting a corresponding signal, a position sensor 24, an LP-EGR gas temperature sensor 26 measuring a temperature of a LP-EGR gas and outputting a corresponding signal and a timer 28.

The controller 300 may be implemented as one or more microprocessors operating by a predetermined program, and the predetermined program may include a series of commands for performing the embodiment of the present invention.

In embodiments, the vehicle includes an engine 90 including an engine block 100 and a cylinder head 105, an LP-EGR cooler 110, a heater 115, a radiator 130, an oil cooler 135, an oil control valve 140, a HP-EGR valve 145 and a coolant pump 155.

The coolant pump 155 pumps the coolant to a coolant inlet side of the engine block 100 and the pumped coolant is distributed to the engine block 100 and the cylinder head 105.

The coolant control valve unit 125 receives the coolant from the cylinder head 105 and may control an opening rate of a coolant outlet side coolant passage of the engine block 100 to control the coolant flow at the outlet side passage of the engine block 100.

The first coolant temperature sensor 120 sensing the temperature of the coolant exhausted from the cylinder head 105 is disposed on the coolant control valve unit 125.

The second coolant temperature sensor 121 sensing the temperature of the coolant exhausted from the engine block 100 is disposed on the engine block 100.

The coolant control valve unit 125 may respectively control the coolant flow distributed to the heater 115 and the radiator 130. In embodiments, the coolant may pass through the low pressure EGR (LP-EGR) cooler 110 before passing through the heater 115, and the heater 115 and the low pressure EGR cooler 110 may be disposed in series or in parallel in the aspect of the coolant flow.

The heater 115 may not be limited to an element for heating inside of a vehicle. In embodiments, the heater 115 in detailed description and claims may be a heater, an air conditioner, or a HVAC (Heating, Ventilation and Air Conditioning) and so on.

The coolant control valve unit 125 always supplies the coolant to the HP-EGR (high pressure exhaust gas recirculation) valve 145 and the oil cooler 135.

Also, a part of engine oil circulated along the engine block 100 and the cylinder head 105 is cooled while circulating the oil cooler or oil coolant heat exchanger 135 in which the engine oil heat-exchanges with the coolant, and the engine oil control valve 140 is disposed between the engine 90 and the oil cooler or oil coolant heat exchanger 135 for controlling flowing of the engine oil.

The LP-EGR gas valve 160 is provided upstream of the LP-EGR cooler 110 to control the flow of the LP-EGR gas delivered to the LP-EGR cooler 110. And the exhaust gas passing through the LP-EGR cooler 110 is transmitted to a combustion chamber of the engine 90. The LP-EGR gas temperature sensor 26 is provided upstream of the LP-EGR cooler 110 to measure the temperature of the LP-EGR gas.

Reference is made to known technology for the structure and function of elements according to embodiments of the present invention, and a detailed description thereof is omitted.

Figure 3:
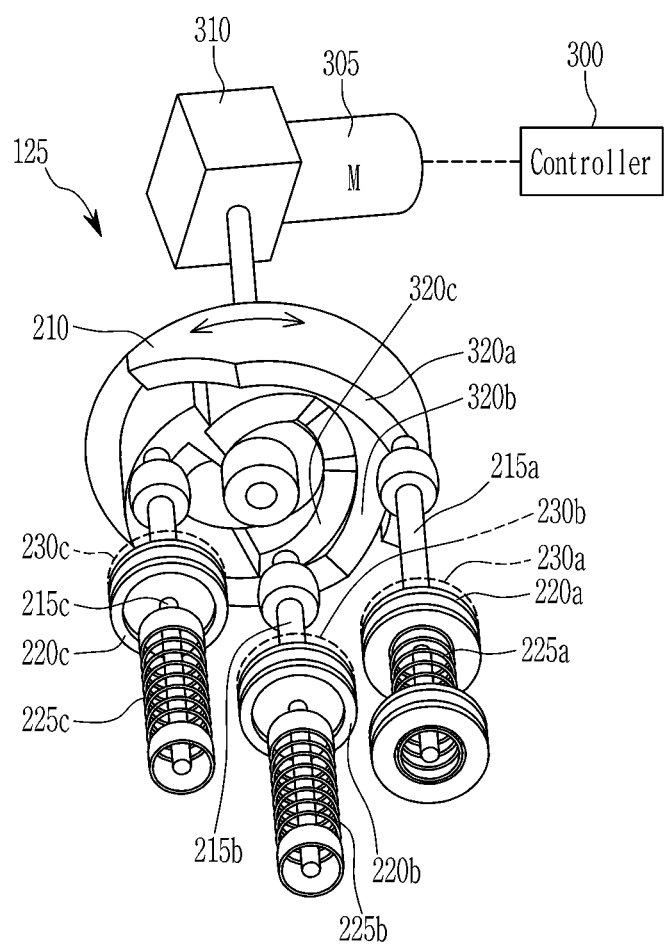
FIG. 3 is a partial exploded perspective view of a coolant control valve unit of a control system applicable to a control method according to an embodiment of the present invention.

FIG. 3 is a partial exploded perspective view of a coolant control valve unit of a control system applicable to a control method according to an embodiment of the present invention.

Referring to FIG. 3, in embodiments, the coolant control valve unit 125 includes a cam 210 that includes tracks or cam surfaces, rods or cam followers contacting the tracks, valves connected with the rods and elastic members biasing the valves in a direction that the valves may close coolant passages. In another embodiment, elastic members may bias the valves in a direction that the valves open coolant passages.

A plurality of tracks, for example, a first track 320a, a second track 320b, and a third track 320c, each has a predetermined inclination and height. A plurality of rods, for example, a first rod 215a, a second rod 215b, and a third rod 215c, are provided in a lower portion of the cam 210 such that the first, second, and third rods 215a, 215b, and 215c that respectively contact the first, second, and third tracks 320a, 320b, and 320c and can move downward depending on a rotation position of the cam 210. In embodiments, the elastic members include a first elastic member 225a, a second elastic member 225b, and a third elastic member 225c that respectively elastically support the first, second, and third rods 215a, 215b, and 215c.

While the first, second, and third elastic members 225a, 225b, and 225c are compressed depending on the rotation position of the cam 210, a first valve 220a, a second valve 220b, and a third valve 220c are respectively mounted to the first, second, and third rods 215a, 215b, and 215c and can respectively open and close a first coolant passage 230a, a second coolant passage 230b, and a third coolant passage 230c. In embodiments, opening rates of each passage 230a, 230b, and 230c are controlled according to the rotation position of the cam 210.

The controller 300 receives vehicle operation conditions, (e.g., a coolant temperature, an ambient air temperature, a rotation position signal of the position sensor 24 detecting a rotation position of the cam 210 and so on) from the various sensors of the vehicle operation state detecting portion 10, and controls an operation of a motor 305. The motor 305 changes the rotation position of the cam 210 through a gear box 310.

In embodiments, the position sensor 24 may be a sensor that directly detects a rotation position of the cam 210. In another embodiment, the controller 300 may indirectly calculate the rotation position of the cam 210 by detecting a rotation portion of the motor 305 through a resolver.

The first coolant path 230a is fluidly communicated with the LP-EGR cooler 110, the second coolant path 230b is fluidly communicated with the radiator 130, and the third coolant path 230c is fluidly communicated with the engine block 100.

Figure 4:
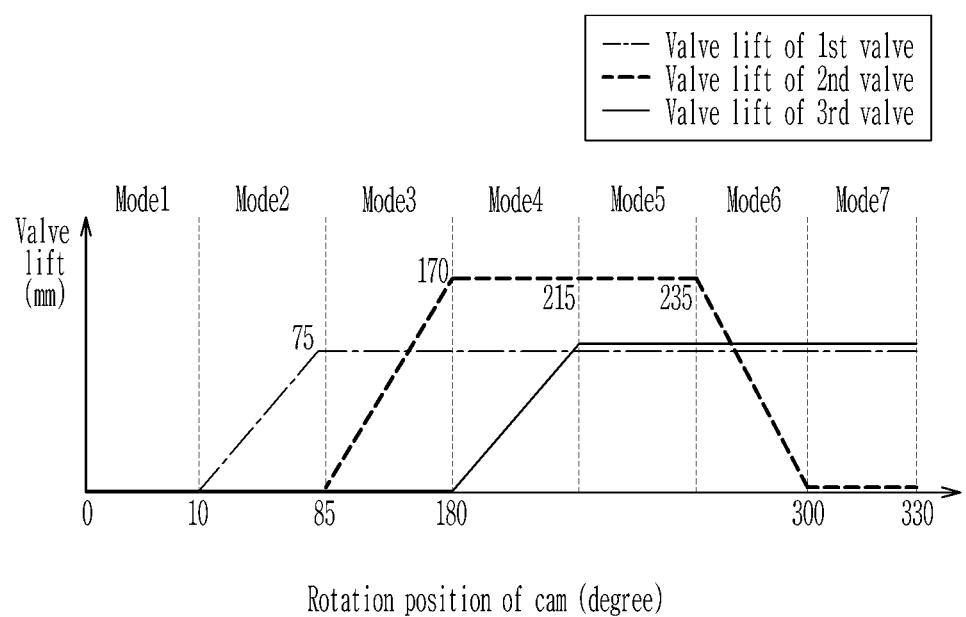
FIG. 4 is a graph of control modes of a control system applicable to a control method according to an embodiment of the present invention.

FIG. 4 is a graph of control modes of a control system applicable to a control method according to an embodiment of the present invention.

In FIG. 4, the horizontal axis denotes a rotation position of the cam 210, and the vertical axis denotes valve lifts (or moving distance) of the respective valves 220a, 220b, and 220c. In embodiments, lifts of each valve 220a, 220b and 220c is proportional to the opening rates of each of the coolant passages 230a, 230b, and 230c.

In the first mode, the first, second and third coolant passages 230a, 230b, and 230c respectively corresponding to the LP-EGR cooler 110, the radiator 130 and the cylinder block 100 are blocked. Here, the valve lift is zero.

In the second mode, the second and third coolant passages 230b and 230c respectively corresponding to the radiator 130 and the engine block 100 are closed, and the opening rate of the first coolant passage 230a corresponding to the LP-EGR cooler 110 is controlled.

In the third mode, the third coolant passage 230c corresponding to the engine block 100 is closed, the opening rate of the second coolant passage 230b corresponding to the radiator 130 is controlled, and the opening rate of the first coolant passage 230a corresponding to the LP-EGR cooler 110 is maximized.

In the fourth mode, the opening rate of the third coolant passage 230c corresponding to the engine block 100 is controlled, the opening rate of the second coolant passage 230b corresponding to the radiator 130 is maximized, and the opening rate of the first coolant passage 230a corresponding to the LP-EGR cooler 110 is maximized.

In the fifth mode, the opening rate of the third coolant passage 230c corresponding to the engine block 100 is maximized, the opening rate of the second coolant passage 230b corresponding to the radiator 130 is maximized, and the opening rate of the first coolant passage 230a corresponding to the LP-EGR cooler 110 is maximized.

In the sixth mode, the opening rate of the third coolant passage 230c corresponding to the engine block 100 is maximized, the opening rate of the second coolant passage 230b corresponding to the radiator 130 is controlled, and the opening rate of the first coolant passage 230a corresponding the LP-EGR cooler 110 is maximized.

In the seventh mode, the opening rate of the third coolant passage 230c corresponding to the engine block 100 is maximized, the second coolant passage 230b corresponding to the radiator 130 is blocked, and the opening rate of the first coolant passage 230a corresponding to the LP-EGR cooler 110 is maximized.

In the first mode, as the flow of the coolant is minimized, the temperature of the engine oil and the coolant quickly increased from their low temperature state.

In the second mode, the coolant flow to the heater or the LP-EGR cooler 110 is provided and controlled, and the engine warm-up is executed and continued.

In the third mode, a coolant temperature is controlled by adjusting an amount of the coolant toward to a radiator cooling section.

In the fourth mode, the temperature of the engine block 100 is controlled by the operation of a cylinder block cooling section.

In one driving condition, an engine heating amount is high and it may be difficult to secure the cooling amount as a maximum cooling section. Thus, in the fifth mode, a separation cooling is released such that a cooling performance of the engine block may be secured.

In the sixth mode, coolant temperatures at the cylinder head and the block may be separately controlled by the operation of the cylinder block cooling section and radiator cooling section.

Figure 5:
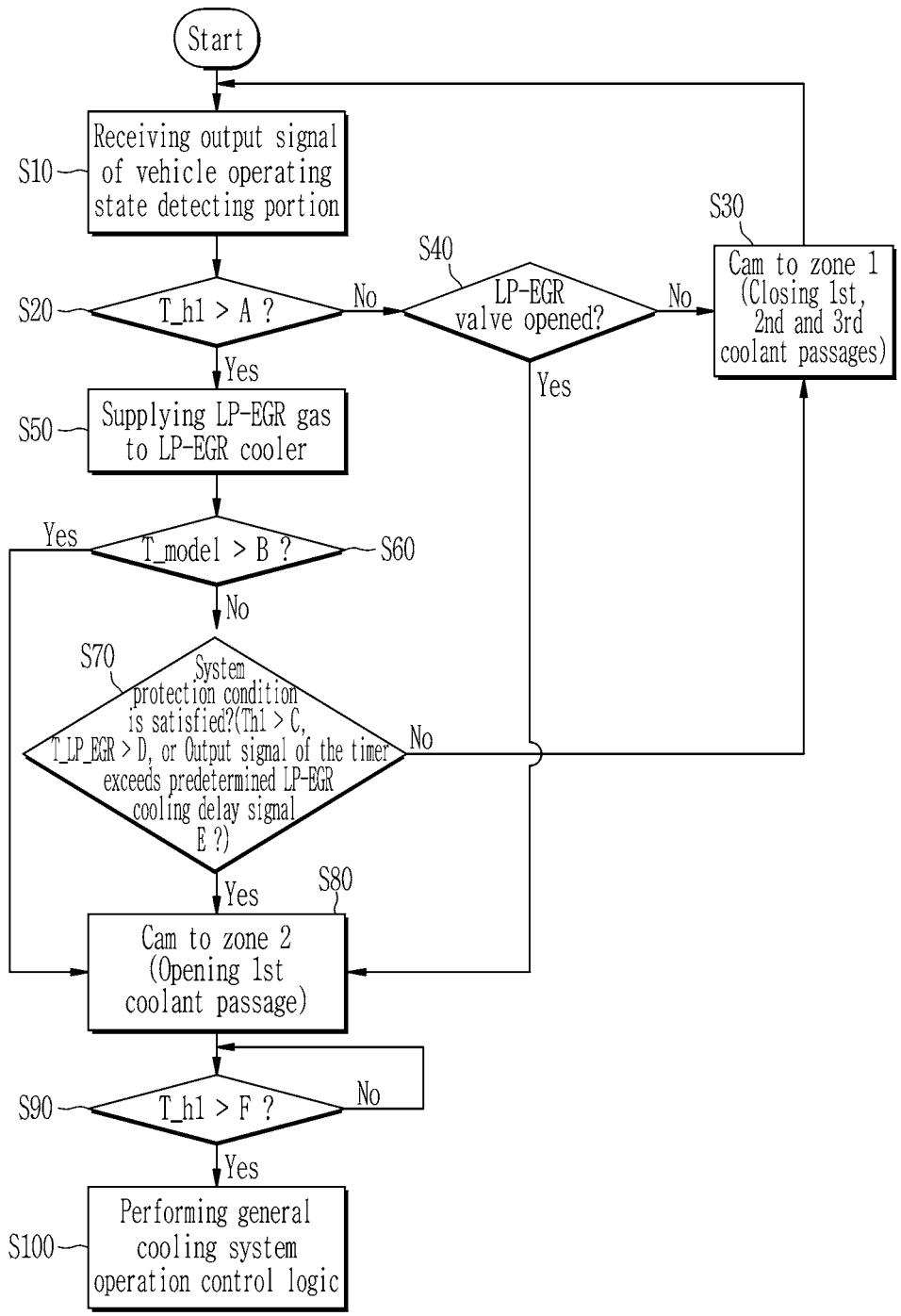
FIG. 5 is a flowchart showing a control method according to an embodiment of the present invention.

FIG. 5 is a flowchart showing a control method according to an embodiment of the present invention.

The control method according to embodiments of the present invention may be applied to the vehicle and the cooling system described above. In particular, it can protect the engine by suppressing the sudden temperature change of the engine while securing the heating performance under the low ambient temperature in initial start of the engine.

The controller 300 receives the output signals from the plurality of sensors of the vehicle operating state detecting portion 10 (S10) and determines whether the output signal of the first coolant temperature sensor 12 satisfies a predetermined LP-EGR gas supply condition (S20).

By blocking the coolant inflow to the LP-EGR cooler 110 in cold state, the devices and portions that are heated can be reduced and thus the engine warm-up speed of the engine and fuel efficiency may be enhanced.

If the coolant temperature T_h1 through the cylinder head 105 exceeds a temperature A, for example, LP-EGR gas is flowed into the LP-EGR cooler 110. This prevents or minimizes engine durability deterioration due to condensate generation inside the LP-EGR cooler 110. And, the temperature A to prevent or minimized the condensate generation may be determined by the experiment, and can be set, for example, from about 50° C. to about 70° C.

If the LP-EGR gas supply condition is satisfied, the controller 300 controls the LP-EGR valve 160 to open, and supplies the LP-EGR gas to the LP-EGR cooler 110 in step S50.

The controller 300 estimates the coolant temperature in the LP-EGR cooler 110 according to the output signal of the vehicle operation state detecting portion 10 and determines whether the predicted coolant temperature T_model in the LP-EGR cooler 110 corresponds to the coolant supply condition (S60), and the controller 300 controls the operation of the coolant control valve unit 125 to open the first coolant passage 230a if the coolant supply condition is satisfied in step S80.

The coolant temperature prediction in the LP-EGR cooler 110 may, for example, be determined according to the output signals of the first coolant temperature sensor 12, the second coolant temperature sensor 14, the oil temperature sensor 16, the ambient temperature sensor 18, the accelerator pedal sensor 20, the vehicle speed sensor 22 and the LP-EGR gas temperature sensor 26 and the coolant capacity, coolant specific heat in the LP-EGR cooler 110, metal capacity of the LP-EGR cooler 110, specific heat of the LP-EGR cooler 110 material, and the like. Also, the coolant temperature prediction in the LP-EGR cooler 110 may be determined by inputting the output signals of the vehicle operation state detecting portion 10 to a predetermined map or lookup table prepared in advance by experiment.

The coolant supply condition can be satisfied, for example, when the coolant temperature T_model in the LP-EGR cooler 110 is a temperature B or higher. The temperature B may be set to a temperature capable of suppressing the generation of condensate in the LP-EGR cooler 110, and may be set to, for example, about 50° C. to about 70° C.

The step S80 of opening the first coolant passage 230a may be performed, for example, by operating the coolant control valve unit 125 in the second mode.

If the coolant temperature does not correspond to the coolant supply condition, the controller 300 determines whether at least one of the output signals of the first coolant temperature sensor 12, the LP-EGR gas temperature sensor 26 and the output signal of the timer 28 corresponds to a predetermined system protection condition if the coolant temperature does not correspond to the coolant supply condition (S70), and the controller 300 controls the operation of the coolant control valve unit 10 to open the first coolant passage 230a if the system protection condition is satisfied S80.

An error may occur in the prediction of the coolant temperature in the LP-EGR cooler 110, if so, the temperature in the LP-EGR cooler 110 may become excessive and the LP-EGR cooler 110 may be damaged.

Therefore, in order to prevent or avoid damage to the LP-EGR cooler 110 even if an error occurs in the coolant temperature prediction, it is determined whether or not the system protection is required.

The system protection condition may include a first system protection condition in which the output signal of the first coolant temperature sensor 12 exceeds a predetermined warm driving temperature.

For example, the warm driving temperature may be set at about 90° C., and even if the modeled coolant temperature T_model does not reach a temperature at which condensation generation can be suppressed, damage of the LP-EGR cooler 110 may be prevented or avoided.

The system protection condition may include a second system protection condition in which the output signal T_LP_EGR of the LP-EGR gas temperature sensor 26 exceeds a predetermined LP-EGR gas reference temperature.

For example, the LP-EGR gas reference temperature may be set to about 300° C., and even if the modeled coolant temperature T_model does not reach the temperature at which condensation generation can be suppressed, the first coolant passage 230a is opened to prevent damage of the LP-EGR cooler 110.

The system protection condition may include a third system protection condition in which the output signal of the timer 28 exceeds a predetermined LP-EGR cooling delay signal.

For example, the LP-EGR cooling delay signal may be set to about 800 seconds to about 1000 seconds, and the LP-EGR cooling delay signal may vary depending on the output signal of the vehicle operation state detecting portion 10. For example, the LP-EGR cooling delay signal E can be set to a short value when it is determined that the outdoor temperature is high, or the engine load is large from the output signal of the sensor 20.

If the system does not meet the protection condition, the controller 300 controls the operation of the coolant control valve unit 125 to close the first coolant passage 230a, the second coolant passage 230b and the third coolant passage 230c in step S30.

In other words, the coolant control valve unit 125 operates in the first mode, and thus, the warm-up of the engine 90 may be performed rapidly.

The controller 300 further includes a step S40 of determining whether the LP-EGR valve 160 has been opened if the controller 300 does not correspond to the LP-EGR gas supply condition. And If the EGR valve 160 has been opened, the controller 300 may control the operation of the coolant control valve unit 125 to open the first coolant passage 230a (S80).

In embodiments, if the LP-EGR valve 160 has been opened even though the coolant temperature T_h1 passing through the cylinder head 105 is relatively low, the LP-EGR gas may be supplied due to an error of the control logic. In this situation, the first coolant passage 230a is opened for preventing the LP-EGR cooler 110 from being damaged.

If the LP-EGR valve has not been opened, the controller 300 controls the operation of the coolant control valve unit 125 to close the first coolant passage 230a, the second coolant passage 230b and the third coolant Close passage 230c (S30). In other words, the coolant control valve unit 125 operates in the first mode so that the engine warm-up may be performed rapidly.

If the first coolant passage 230a is opened and the coolant temperature T_h1 passing through the cylinder head 105 exceeds a predetermined temperature F, for example, about 90° C. in step S90, then the controller 300 stops the control process according to the embodiment of the present invention and performs the general cooling system operation control logic (S100).

That is, the operation of the first mode to the seventh mode described above is performed.

As described above, according to the control method of the cooling system by the embodiment of the present invention, the engine warm-up can be speeded up by delaying the coolant supply inflow to the LP-EGR cooler at the early start.

Also, according to the control method of the cooling system by the embodiment of the present invention, it is possible to prevent the overheating of the cooling system while blocking the coolant inflow to the LP-EGR cooler.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

While embodiments of this invention has been described, it is to be understood that the invention is not limited to the disclosed embodiments, but, on the contrary, is intended to cover various modifications and equivalent arrangements included within the spirit and scope of the appended claims.

What is claimed is:

1. A control method for a cooling system including a vehicle operation state detecting portion, a coolant control valve unit, an LP-EGR valve and a controller, wherein the vehicle operation state detecting portion comprises a first coolant temperature sensor, a second coolant temperature sensor, an oil temperature sensor, an ambient temperature sensor, an accelerator pedal sensor, a vehicle speed sensor, an LP-EGR temperature sensor and a timer, the first coolant temperature sensor detecting a temperature of a coolant flowing through a cylinder head and outputting a corresponding signal, the second coolant temperature sensor detecting a temperature of the coolant flowing through an engine block and outputting a corresponding signal, the oil temperature sensor detecting a temperature of oil and outputting a corresponding signal, the ambient temperature sensor detecting a temperature of ambient air and outputting a corresponding signal, the accelerator pedal sensor detecting an operation angle of an accelerator pedal and outputting a corresponding signal, the vehicle speed sensor detecting a speed of a vehicle and outputting a corresponding signal, the LP-EGR temperature sensor detecting a temperature of LP-EGR gas and outputting a corresponding signal, wherein the coolant control valve unit receives the coolant from the cylinder head and comprises a cam which controls opening rates of a first coolant passage communicated with a LP-EGR cooler, a second coolant passage communicated with a radiator and a third coolant passage communicated with the engine block, wherein the LP-EGR valve controls flow of LP-EGR gas supplied to the LP-EGR cooler, wherein the controller controls operations of the coolant control valve unit and the LP-EGR valve according to the output signals of the vehicle operation state detecting portion, the control method comprising:

determining, by the controller, whether the output signal of the first coolant temperature sensor satisfies a LP-EGR gas supply condition;

controlling the LP-EGR valve to open by the controller when determined that the output signal of the first coolant temperature sensor satisfies the LP-EGR gas supply condition;

estimating, by the controller, a coolant temperature in the LP-EGR cooler based on the output signals of the vehicle operation state detecting portion, and determining whether the estimated coolant temperature in the LP-EGR cooler satisfies a coolant supply condition; and controlling the operation of the coolant control valve unit by the controller to open the first coolant passage when determined that the estimated coolant temperature in the LP-EGR cooler satisfies the coolant supply condition.

2. The control method of claim 1, further comprising:

determining whether at least one of the output signals of the first coolant temperature sensor, the LP-EGR gas temperature sensor or the timer satisfies a system protection condition when determined that the estimated coolant temperature in the LP-EGR cooler does not satisfy the coolant supply condition, and wherein the controller controls the operation of the coolant control valve unit to open the first coolant passage when determined that at least one of the output signals of the first coolant temperature sensor, the LP-EGR gas temperature sensor or the timer satisfies the system protection condition.

3. The control method of claim 2, wherein the system protection condition includes a first system protection condition in which the output signal of the first coolant temperature sensor exceeds a predetermined warm driving temperature.

4. The control method of claim 3, wherein the system protection condition includes a second system protection condition in which the output signal of the LP-EGR gas temperature sensor exceeds a predetermined LP-EGR gas reference temperature.

5. The control method of claim 4, wherein the system protection condition includes a third system protection condition in which the output signal of the timer exceeds a predetermined LP-EGR cooling delay signal.

6. The control method of claim 2, further comprising closing the first coolant passage, the second coolant passage and the third coolant passage by controlling the operation of the coolant control valve unit when determined that at least one of the output signals of the first coolant temperature sensor, the LP-EGR gas temperature sensor or the timer does not satisfy the system protection condition.

7. The control method of claim 1, further comprising:

determining whether the LP-EGR valve has been opened when determined that the output signal of the first coolant temperature sensor does not satisfy the LP-EGR gas supply condition, wherein the controller controls the operation of the coolant control valve unit to open the first coolant passage if the LP-EGR valve has been opened.

8. The control method of claim 7, wherein the controller controls the operation of the coolant control valve unit to close the first coolant passage, the second coolant passage and the third coolant passage if the LP-EGR valve has not been opened.

\* \* \* \* \*